United States Patent [19]

Pieczulewski

[11] Patent Number: 4,463,488
[45] Date of Patent: Aug. 7, 1984

[54] INDEXING WORK TABLE

[75] Inventor: Daniel J. Pieczulewski, South Lyon, Mich.

[73] Assignee: A. G. Davis Gage & Engineering Co., Hazel Park, Mich.

[21] Appl. No.: 244,589

[22] Filed: Mar. 17, 1981

[51] Int. Cl.³ .............................................. B23P 15/14
[52] U.S. Cl. .................................... 29/159.2; 409/51; 409/57
[58] Field of Search ....................... 409/50, 51, 57, 61; 59/92 ND; 148/147; 29/159.2, 558; 74/347, 416, 433, 434, 665 K

[56] References Cited

U.S. PATENT DOCUMENTS

| | | | |
|---|---|---|---|
| 968,495 | 8/1910 | Probst | 74/347 |
| 1,007,890 | 11/1911 | Rash et al. | 74/347 |
| 1,069,004 | 7/1913 | Haines | 74/347 |
| 1,129,369 | 2/1915 | Wendle | 74/347 |
| 2,261,052 | 10/1941 | Coffin et al. | 409/61 |
| 2,294,733 | 9/1942 | Brady | 51/92 ND |
| 2,708,159 | 5/1955 | Foley et al. | 148/147 |
| 4,364,204 | 12/1982 | Peiseler | 409/50 |

Primary Examiner—Lowell A. Larson
Attorney, Agent, or Firm—Remy J. VanOphem

[57] ABSTRACT

A rotary indexing table having a generally circular top plate rotatably secured to a fixed base structure is disclosed. An outer race annular ring is connected to the top of the fixed base structure and extends radially over a central bore formed in the top face of the fixed based structure. A first ring of teeth is formed on the circular top plate. A second ring of teeth is formed on the outer race annular ring. Both the first and second rings of teeth face toward the central bore in the fixed base structure. A piston is slidably mounted in the central bore. The piston has a third ring of teeth aligned with the first ring of teeth and a fourth ring of teeth aligned with the second ring of teeth. A method of forming the third and fourth rings of teeth on the piston is also disclosed. The method includes mounting a sine block on a work table. Then fastening a rotary indexing table on the top of the sine block. Next, securing the piston to the top of the rotary indexing table. Then, setting a first predetermined angle on the sine block to fix a first coning angle from the central axis of the piston. This is followed by cutting one ring of concentric teeth on the piston. Then, adjusting the sine block to a second predetermined angle to fix a second coning angle from the central axis of the piston. Finally, cutting the other ring of concentric teeth on the piston.

19 Claims, 8 Drawing Figures

INDEXING WORK TABLE

FIELD OF THE INVENTION

This invention relates to an indexing device, and more particularly, to a rotary indexing fixture so that a workpiece, which is adapted to be supported thereon, can be rotated to a very precise accurate angular dimension.

BACKGROUND OF THE INVENTION

Rotary indexing tables are designed to accommodate a wide range of machining and inspection applications. Rotary indexing tables are of two general types.

The first type utilizes a bearing (either a roller or ball bearing type) to oppose the machining forces. However, roller and ball bearings in a static condition are considered soft (permitting a high rate of deflection) and provide increasing stiffness only as the load increases. Basically, this stiffening effect is caused by the fact that minimal, initial contact area increases in size as the load increases. The usual method used to minimize this effect is to preload the bearing. However, preloading bearings increases friction, causes fatigue and decreases bearing life. Therefore, in rotary indexing tables utilizing bearings, a design compromise must be made which ultimately compromises rigidity of the rotary indexing table.

The second type utilizes a serrated tooth, or Hirth type coupling, which is machined as an integral part of the base and top plate of the rotary indexing table. In its simplest form, a device of this type consists of two 25 serrated tooth plates having the same number of teeth and shape so that one plate can be tightly engaged with the other plate. When the teeth are intermeshed, the plates cannot rotate with respect to each other. However, the angular position of the two plates can be changed by either lifting the top plate with respect to the other, or lowering the bottom plate relative to the top plate, rotating the top plate and, thereafter, re-engaging the teeth to position the top plate in a predetermined angular relationship relative to the bottom plate.

Rotary index tables utilizing the serrated tooth coupling have a number of advantages. For example, there are no joints other than the coupling between the base and the table top. Therefore, all machining forces, such as bending moments and torques, are transmitted from the top plate to the base through the coupling. Thus, the degree of rigidity of the face plate position is directly proportional to the force applied to hold the coupling together and the diameter of the coupling. As the locking force and the diameter of the coupling is increased, the degree of rigidity of the device increases.

Rotary index tables utilizing the aforementioned serrated tooth coupling are also advantageous for rotating work pieces that are being machined or inspected into discrete positions and retaining them firmly in the position selected. For example, if two plates each have 360 teeth, the top plate can be rotated to allow the positioning of a work piece thereon in any of 360 possible positions. This precision arises due to the averaging effect of the serrations, in which the machining inaccuracies of the serrated teeth are averaged out over the entire ring series, to thus provide a precision which is much greater than that with which the individual gear teeth can be manufactured. Another characteristic of the Hirth type coupling is that accuracy tends to improve with wear since the teeth become more and more uniform after repeated indexing cycles.

A rotary index table employing a single ring of serrated teeth is physically limited in the number of teeth that can be formed thereon. This severely limits the subdividing angular resolution achievable. One solution to this problem is the provision of an additional rotary member supported on independent bearings, with the additional rotary member being coupled to the two mating plates. However, the additional coupling and the required bearings are expensive to produce for extreme accuracy. Futhermore, this approach generally results in a fixture which is not as rigid or accurate as desired in such applications.

One attempt to solve this problem is shown in U.S. Pat. No. 3,846,912 issued to Richard J. Newbould on Nov. 12, 1974. Newbould discloses an indexing mechanism utilizing a plurality of plates connected by locking teeth. The discs, or linear plates, are provided with a series of intermeshing teeth between the intermediate adjacent surfaces of the plates. The plates are designed for relative rotation about an axis normal to the planes of the plates. The plates are adapted to be separated in an axial direction to permit relative, independent and desired positioning of the plates relative to a base reference indicia. The initial major divisions of an angle are provided by the position of one of the plates. Smaller divisions of the selected angle are provided by another of the plates. Still smaller divisions of the selected angle are provided by a third plate. It is, however, essential to the effective operation of this mechanism that at least one of the pitches between a pair of meshing plates is not evenly divisible into a circle. Therefore, this necessitates a clearance, or a clearance area, in one of the plates to accommodate nonmeshing or improperly meshing teeth to allow the necessary movement used in subdividing on the other pitches. These clearance areas, however, reduce the locking force available to resist the rotational forces imparted on the top plate by the machining operation. Furthermore, these clearance areas necessitate that the intermeshing teeth on the one plate be segmented. This reduces the number of teeth available on the ring for averaging the tooth error and thus reduces the accuracy of the device. Also, Newbould requires the addition of more plates to achieve greater subdividing with a subsequent loss of system accuracy. Therefore, Newbould cannot generate the locking force inherent in a ring of equally spaced intermeshing teeth and is not able to take advantage of the averaging effect of a ring of equally spaced serrated teeth even with extended usage. Thus, the Newbould device is not suitable for very accurate applications.

Another device utilizing intermeshing teeth is disclosed in U.S. Pat. No. 3,961,780 issued to Joseph J. Saj on June 8, 1976. Saj discloses a rotary indexing table wherein a work support table is rotatably journalled on a base. The plate and base each have a downwardly facing ring of teeth thereon. An axially movable coupling ring has two rings of teeth thereon which register axially. The rings of teeth on the plate, and the rings of teeth on the base, are adapted to mesh with each other to fixedly retain the base at a predetermined angular position relative to the base. A vernier angular adjustment of the top plate relative to the base is provided through an arc motion utilizing a fraction of the spacing between successive teeth on either of the two rings. This angular adjustment is provided by rotating the piston by means of a handle extending through a radially extending slot in the bottom retainer ring. This severely limits the rotation of the ring and the number of angular positions available for the vernier operations.

The accuracy of the Saj device also depends on the accuracy to which the teeth in the two sets of teeth are formed and also upon the ability of the flat inclined faces of the teeth in the two sets of rings to mesh perfectly. Unless the teeth of both rings mesh perfectly, precise positioning will not be achieved and the required extreme accuracy of the indexing operation will not result. To assure perfect meshing of the teeth, Saj weakens his coupling member or piston by a groove. Saj also utilizes a ring to serve as a reaction member which, when pressure is applied to the cylinder, applies a downward force on the ring and thus tends to draw the teeth on the ring downwardly into meshing engagement with the teeth, thereby compensating for any misalignment of the teeth. While this misalignment of the teeth does not adversely affect the rigidity for light machining operations, this arrangement does not provide adequate rigidity in applications with higher machining tool forces.

The basic design of Saj's device also provides for an inherent conflict between the ball bearings which support the top plate for rotation in a horizontal plane and the intermeshing teeth of the coupling. This conflict reduces the effectiveness of the intermeshing with the coupling so that accuracy and the rigidity of the device is further compromised.

Therefore, none of the above-identified prior art rotary index devices provide both the rigidity required to oppose the higher machining forces necessary in many new applications and the desired greater subdividing resolution required.

SUMMARY OF THE INVENTION

The present invention is directed to a rotary indexing table which improves the accuracy of the angular positioning of the top plate in relation to the fixed base structure by utilizing two sets of toothed rings to connect the top plate to the fixed base structure. In addition, the two sets of toothed rings are made to mesh perfectly so that both accurate positioning of the device and enhanced locking forces are achieved. The present invention is also directed to a method of precisely forming teeth on a piston member which is used to couple the fixed base structure with the top plate.

The present invention provides a rotary indexing table including a generally circular top plate having a work piece support face, a mounting face opposite to the work piece support face and a central axis extending perpendicular to the plane of the work piece support face. A fixed base structure is rotatably connected to the top plate. The top plate further rotates about the central axis. The fixed base structure has a top face and a portion defining a central bore extending from the top face. An outer race annular ring is connected to the fixed base structure. The outer race annular ring extends radially toward the longitudinal axis of the fixed base structure. The outer race annular ring has a coupling surface mounted adjacent to the top face of the fixed base structure. A first ring of teeth is formed on the mounting face of the top plate. The first ring of teeth is also formed concentrically about the central axis of the top plate. A second ring of teeth is formed on the coupling surface of the outer race annular ring adjacent to the first ring of teeth. The second ring of teeth is also concentric with the first ring of teeth. The first and second rings of teeth further face the bore in the fixed base structure. A piston is slidably mounted in the bore in the fixed base structure. The piston has a third ring of teeth aligned with the first ring of teeth on the mounting face of the circular top plate and a fourth ring of teeth adjacent to the third ring of teeth. The fourth ring of teeth is aligned with the second ring of teeth on the coupling surface of the outer race annular ring. The fourth ring of teeth is also concentric with the third ring of teeth. A mechanism is provided for axially moving the piston in the bore in the fixed base structure so as to engage and disengage the first ring of teeth with the third ring of teeth and the second ring of teeth with the fourth ring of teeth so as to bring the teeth into and out of meshing engagement. In addition, a first mechanism is provided for rotating the top plate relative to the fixed base structure when the piston is moved in the disengaged position so as to angularly index the top plate in relation to the fixed base structure. Finally, a second mechanism is provided for rotating the piston relative to the top plate and the fixed base structure when the piston is moved into the disengaged position to vernier the angular position of the top plate relative to the fixed base structure.

The present invention also provides a method for forming a pair of concentric rings of teeth on a coupling member. The method includes mounting a sine block on a work plate. Then, fastening a rotary index table on top of the sine block. Next, securing the coupling member to the top of the rotary index table. Then, setting a first predetermined angle on the sine block to fix a first coning angle from the central axis of the coupling member. This is followed by cutting the first of the pair of concentric rings of teeth on the coupling member. Then adjusting the sine block to a second predetermined angle to fix a second coning angle from the central axis of the coupling member. Finally, cutting the second of the pair of concentric rings of teeth on the coupling member.

It is an object of the present invention to provide a rotary indexing device which enables positioning of the top plate in a vernier fashion relative to the fixed base structure so that a very high subdividing angular resolution is achievable and yet insure the perfect meshing of the rings of teeth on the coupling members without the need of compensation so that the rigidity of the structure is not compromised.

It is still a further object of the present invention to provide a method for forming a pair of concentric rings of teeth on a coupling member used to couple the top plate with the fixed base structure so as to provide an angular indexing device capable of achieving a very high subdividing angular resolution and for forming the pair of concentric toothed rings on the coupling member very accurately so that the coupling member meshes with the complimentary rings of teeth on the base structure and the top plate member so that the rigidity and accuracy of the overall structure is not compromised.

These an other objects of the present invention will become apparent from the following description and the accompanying drawings.

DETAILED DESCRIPTION OF A PREFERRED EMBODIMENT

Figure 1:
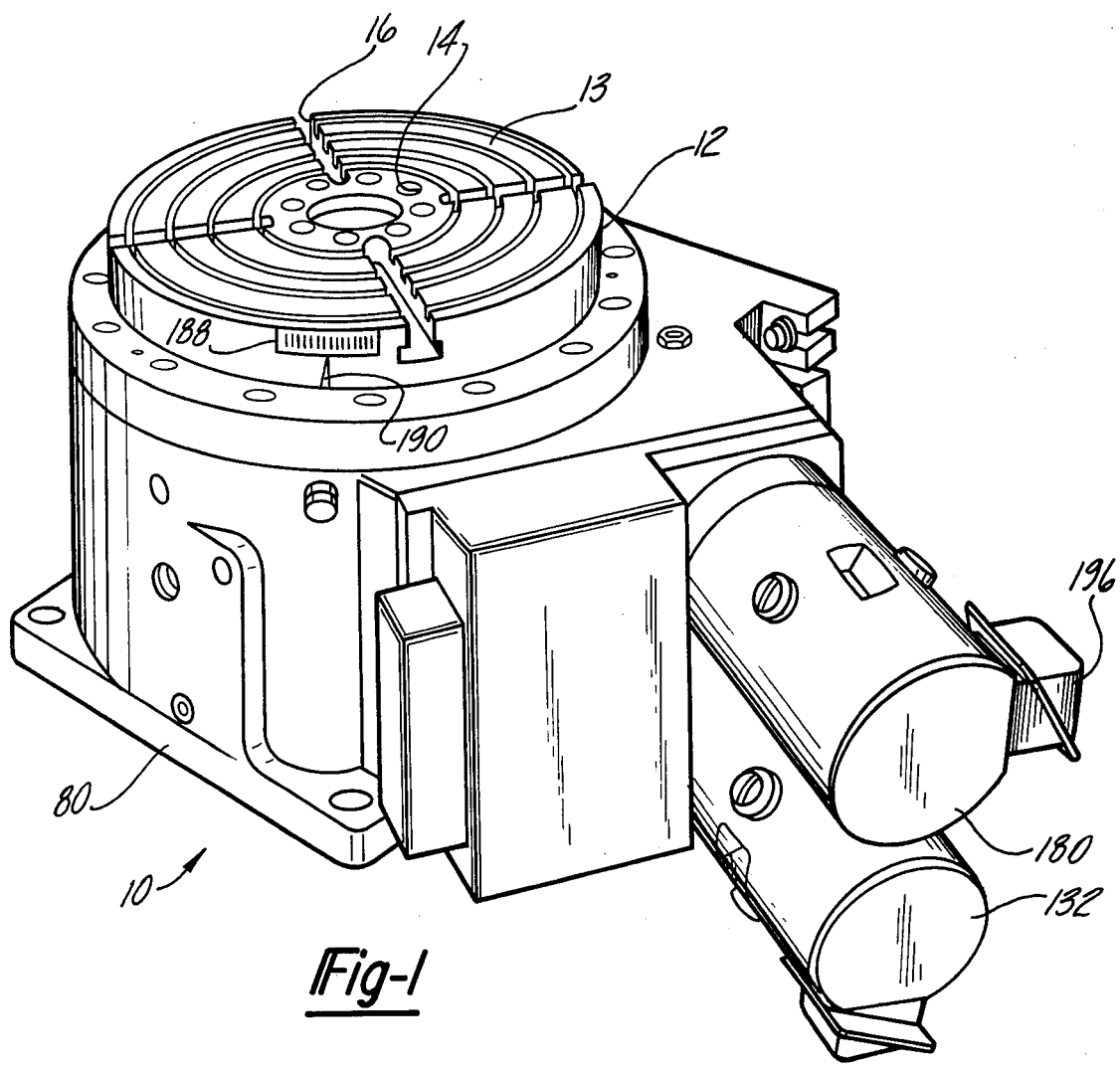
FIG. 1 is a perspective view of the rotary indexing table according to the present invention.
Figure 2:
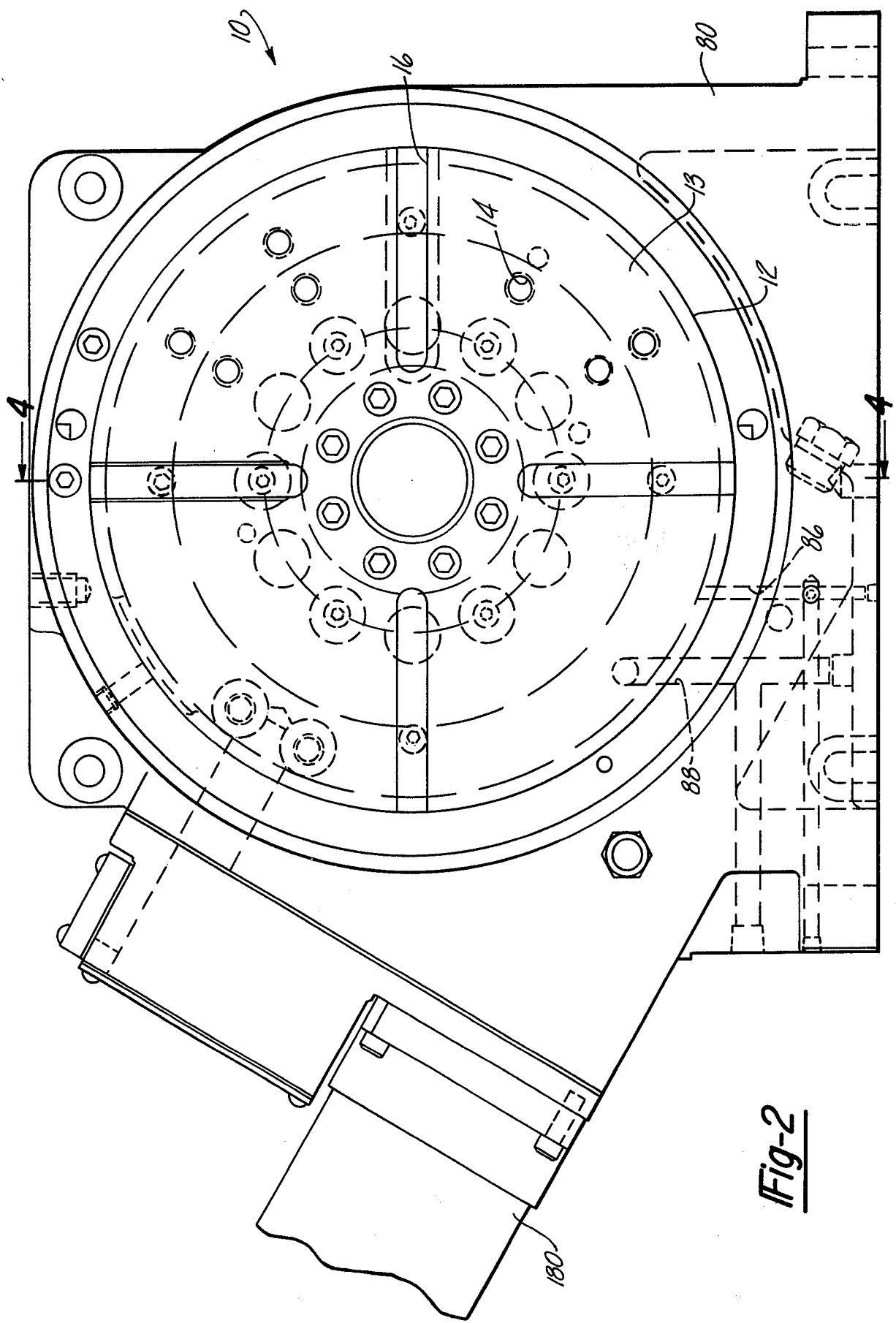
FIG. 2 is a top view of the rotary indexing table shown in FIG. 1.

In FIGS. 1 and 2, the rotary indexing table, according to the present invention, is generally designated by the numeral 10. The rotary indexing table 10 has a generally circular top plate 12 which is mounted for rotation during indexing about an axis which is substantially perpendicular to the work piece support face 13 of the circular top plate 12. The circular top plate 12 is provided with suitable mounting holes and slots 14 and 16, respectively, in a conventional fashion. A fixed base structure, generally designated by the numeral 80 provides a support for rotatably mounting the circular top plate 12 thereon. The fixed base structure 80 can be supported on any suitable support such as a table of a milling machine (not shown).

Figure 4:
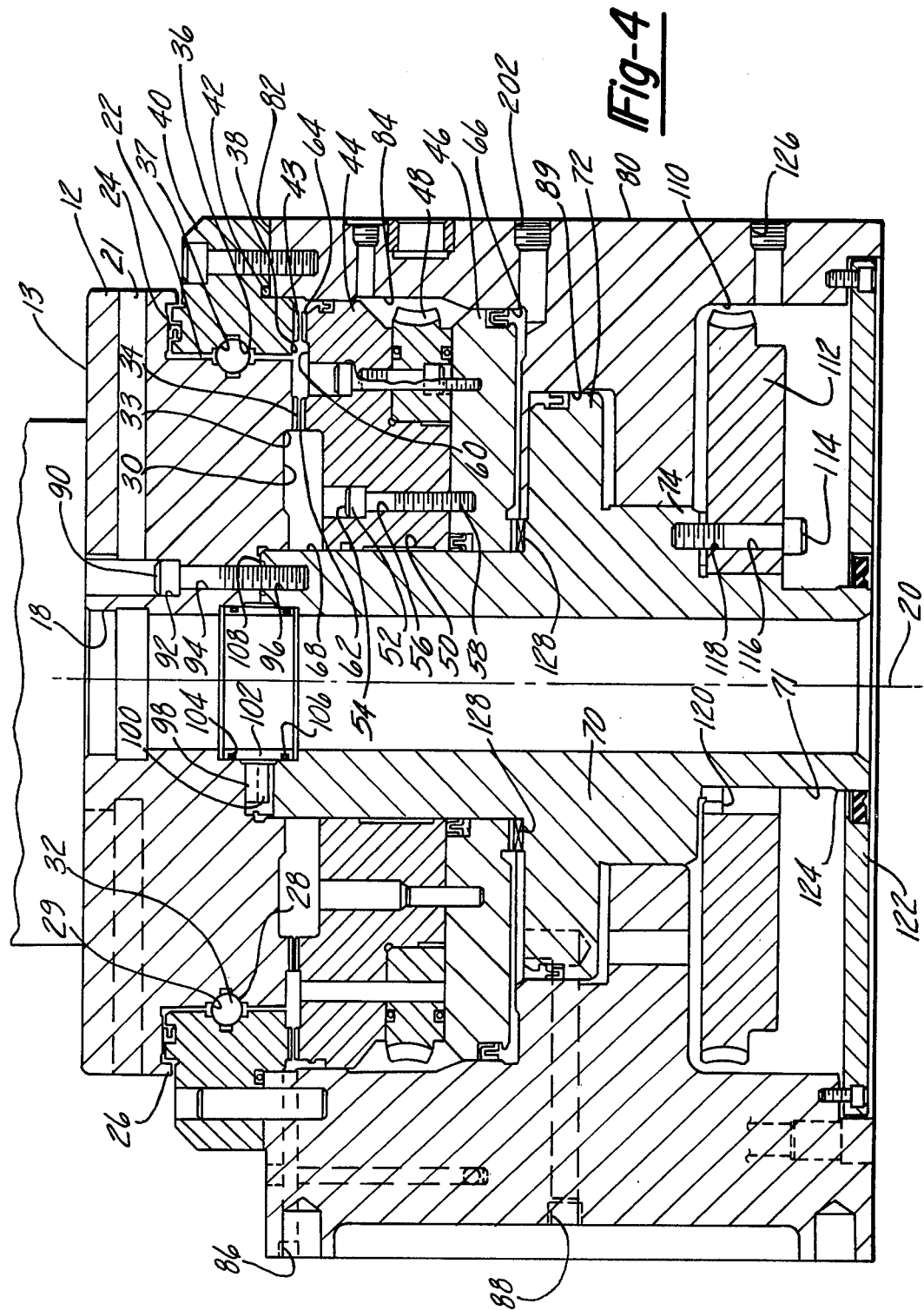
FIG. 4 is a sectional view taken along line 4—4 of FIG. 2.

As best shown in FIG. 4, the details of the circular top plate 12, the fixed base structure 80 and the mounting, drive and lock and release arrangements are revealed, as well as the indexing locating means. The circular top plate 12 is formed with an axially extending center bore 18 therein. The center bore 18 is coaxial with a central axis 20 which extends perpendicular to the plane of the work piece support face 13 of the circular top plate 12. The circular top plate 12 further has a first outer diameter 21 which is adjacent to the work piece support face 13 and a second outer diameter 22 which is adjacent to the first outer diameter. The second outer diameter 22 is smaller than the first outer diameter 21. A radial shoulder portion 24 is formed between the first and second outer diameters of the circular top plate 12. The first outer diameter 21 has an axially extending skirt portion indicated at 26 which is of circular shape and in conformity with the first outer diameter 21 of the circular top plate 12. The axially extending skirt portion 26 extends beyond the radial shoulder portion 24. The mounting surface 30 is formed opposite to the work piece support face 13. In between the mounting surface 30 and the radial shoulder portion 24, a circular race ring 28 is formed in the second outer diameter 22. The circular race ring 28 is formed with a first semicircular raceway 29 in which a plurality of ball bearings 32 are disposed for a purpose to be described later herein.

An outer race coupling member 40 is securely mounted to the top face 82 of the fixed base structure 80 by a series of cap screws and a plurality of dowels as is conventional. The cap screws are arranged about the axis of the outer race member 40 and pass into counterbores, body passages and into threaded bores formed in the top face 82 of the fixed base structure 80. The dowels are also arranged about the axis of the outer race member and pass into bores extending into the top face 82 of the fixed base structure 80 to assure radial location of the outer race member relative to the fixed base structure 80. The outer race coupling member 40 further has a radially inwardly extending portion so that its inner diameter is adjacent but spaced away from the second outer diameter 22 of the circular top plate 12. The outer race coupling member 40 is further formed with a first top portion and a second top portion. The first top portion extends from its inner diameter towards the axially extending skirt portion 26 and the second base portion extends from the outer diameter of the outer race coupling member 40 towards the first face portion. The first and second face portions form an axially extending shoulder portion therebetween. The first top face has a cavity formed therein to permit insertion of a gas seal therein. The inner diameter of the outer race coupling member further has a race ring 36 which is formed opposite to the circular race ring 28 in the second outer diameter 22 of the circular top plate 12. The race ring 36 has a second semicircular raceway 37 which is complimentary with the first semicircular raceway 29 in the circular top plate 12. Thus, the first and second semicircular raceways 29, 37 respectively form an annulus within which the plurality of ball bearings 32 are held therein. When the second semicircular raceway 37 of the outer race coupling member 40 and the first semicircular raceway 29 of the circular top plate member 12 are aligned with each other, the ball bearings 32 loosely fit within the annulus formed thereby. However, when the radial shoulder portion 24 moves axially towards the first top portion of the outer race coupling member 40, the first and second semicircular raceways 29, 37 respectively shift relative to each other to preload the ball bearings 32 and to prevent further axial movement of the circular top plate 12 relative to the outer race coupling member 40. The outer race coupling member further has a coupling surface 38 which is opposite to the first and second top portions and substantially perpendicular to its inner diameter. A suitable O-ring seal 42 is provided between the top face 82 of the fixed base structure 80 and the outer race coupling member 40 to insure the sealing of the interior of the device.

A piston 44 is mounted for slidable motion in a central bore 84 formed in the fixed base structure 80. The piston or coupling member 44 includes a base member 46, a top member 50 and a first gear drive 48 mounted in an annular cavity in the top member. The first gear drive 48 is sandwiched between the base member 46 and the top member 50. The base member 46 is connected to the top member 50 by a series of cap screws 52 arranged about the central axis of the piston 44. The cap screws 52 pass into counterbores 54, body passages 56 and threaded bores 58 formed in the top face of the base member 46. To assure rigidity between the base member 46 and the top member 50, a series of pull dowel pins are alternately arranged with the cap screws 52 about the central axis of the piston 44. The pull dowel pins pass into counterbores and body passages formed in the top member 50 and the base member 46. The body passages form a tight fit with dowel pins so as to hold the top member and the base member in a unitary fashion. In a similar manner, the first gear drive 48 is secured to the top member 50 by a series of cap screws arranged about the central axis of the piston 44. The cap screws similarly pass into counterbores, body passages and into threaded bores formed in the top member 50 and the first gear drive 48. A series of dowel pins are also provided to hold the first gear drive 48 to the top member 50. The dowel pins are similarly arranged about the axis of the piston 44 and pass into body passages formed in the top member 50 and the first gear drive 48. Thus, the aforementioned cap screws and dowel pins hold the top member 50, the first gear drive 48 and the base member 46 in unitary fashion. The base member 46 is further formed with a plurality of annular grooves at its inner diameter and outer diameter. A plurality of corresponding gas seals are inserted into these grooves for a purpose to be described later herein. Sealed O-rings are disposed in appropriate notches formed in the first gear drive 48 between the top member 50, the first gear drive 48 and the base member 46. A counterbore is formed in the outer diameter of the top member 50 and a suitable gas seal is inserted into the notch formed in the outer diameter of the top member 50. The inner diameter of the top member 50 is also formed with a suitable groove into which a suitable seal is provided so that the piston 44 is slidably mounted on its inner diameter over the exterior of the support tube 70.

Figures 3A, 3B:
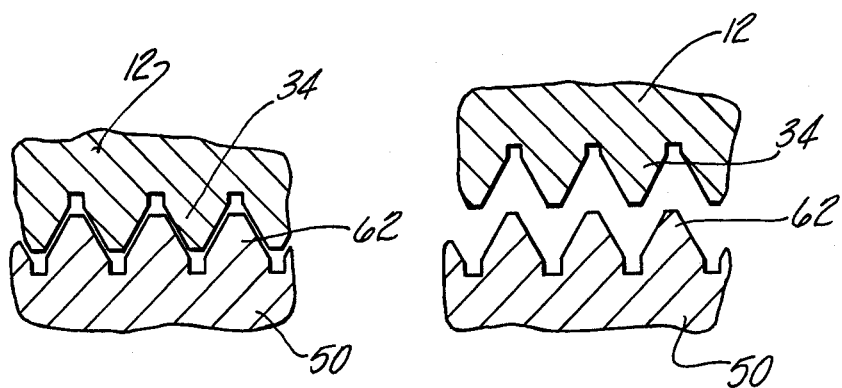
FIGS. 3a and 3b are enlarged fragmentary views of the inner teeth in the locked and released positions respectively.

The top face 60 of the top member 50 is disposed facing the mounting surface 30 of the circular top plate 12 and the coupling surface 38 of the outer race coupling member 40. The mounting surface 30 of the circular top plate 12 has a ring 33 formed thereon. The ring 33 has machined thereon a first ring of accurately formed teeth 34. Likewise, the coupling surface 38 of the outer race coupling member 40 has machined thereon a second ring of teeth 43. The teeth 34, 43 respectively are accurately uniformly spaced and are preferably generally triangular in cross section. The cross section of the first tooth is as indicated in FIGS. 3a and 3b. As shown in FIG. 4, the top face 60 of the top member 50 of the piston 44 is similarly formed with two narrow adjacent rings of teeth thereon. The teeth on the inner ring or the third ring of the top member 50 being designated 62 and the teeth on the outer ring or fourth ring of the top member 50 being designated 64. The third ring of teeth 62 correspond in shape and spacing with the first ring of teeth 34 and the fourth ring of teeth 64 correspond in shape and spacing with the second ring of teeth 43.

Those skilled in the art will recognize that the third ring of teeth 62 on the top face 60 of the top member 50 of the piston 44 must correspond in number with the first ring of teeth 34 on the mounting surface 30 of the circular top plate 12. In addition, it is clear that the fourth ring of teeth 64 on the top face 60 of the piston 44 must also correspond in number with the second ring of teeth 43 on the outer race coupling member 40. However, it is not essential that the teeth on the first and third rings of teeth 34, 62 respectively correspond in number with the teeth on the outer ring, that is, the second and fourth rings of teeth 43, 64 respectively. For example, by way of nonlimiting example, it is preferable that the number of teeth on the first and third rings of teeth 34, 62 be 576 in number and that the second and fourth rings of teeth 43, 64 be 625 in number. Thus, as long as the number of teeth on the first ring of teeth and the third ring of teeth 34, 62 respectively are the same, and the number of teeth on the second and fourth ring of teeth 43, 64 respectively, the two rings of teeth will mesh. Thus, if independent means are provided for rotating the piston or coupling member 44 over an angular rotation of 360° and for independently rotating the circular top plate 12 over a range of 360°, the rotary indexing table 10 can be used in a manner of a vernier to permit various combinations of rotation of the circular top plate 12 and the piston 44. This allows for 360,000 possible angular positions of the circular top plate 12 relative to the fixed base structure 80. This feature of the rotary indexing table 10 will be described later herein.

As previously discussed, the piston 44 is mounted for slidable motion in the central bore 84 of the fixed base structure 80 and slidably mounted on its inner diameter over the exterior of the support tube 70. The piston 44 is moved axially in the central bore 84 of the fixed base structure 80 by fluid power so as to engage and disengage the first ring of teeth 34 with the third ring of teeth 62 and the second ring of teeth 43 with the fourth ring of teeth 64. Such fluid power is controlled by a first valving assembly (not shown) which admits fluid under pressure to a first cavity 66 formed between the base member 46, the central bore 84 in the fixed base structure 80 and a first radially extending portion 72 of the support tube 70. On the other hand, a second cavity 68 if formed between the top face 60 and the coupling surface 38 of the outer race coupling member 40 and the mounting surface 30 of the circular top plate 12. The fluid power supplied to the second cavity 68 is controlled by a second valving assembly (not shown). The second valve assembly admits fluid under pressure to the second cavity 68 to cause the piston 44 to move axially away from the outer race coupling member 40 and the circular top plate 12 so as to demesh the first and third rings of teeth 34, 62 respectively and the second and fourth rings of teeth 43, 64 respectively. Inasmuch as the first and second valving assemblies respectively are essentially conventional, the details of same will not be herein described except insofar as it relates to the integration of the same with the rotary indexing table 10. It is preferable, however, that the fluid used to demesh the piston 44 from the circular top plate 12 and the outer race coupling member 40 be air at a pressure between 60 and 80 psig whereas it is preferable that hydraulic fluid in the range of 1000 to 1200 psig be utilized to move the piston 44 into engagement with the outer race coupling member 40 and the circular top plate 12. For this purpose, the fixed base structure 80 has a first pressure port 86 which communicates with the second cavity 68, the first pressure port also is connected to the first valving assembly. Similarly, a second pressure port 88 is provided in the fixed base structure 80 which fluidly communicates with the first cavity 66. A second pressure port 88 is also connected to the second valving assembly. Thus, admission of fluid via the second valving assembly into the first cavity 66 causes the piston to move toward the circular top plate 12. This in turn causes the first and third rings of teeth 34, 62 respectively and the second and fourth rings of teeth 43, 64 respectively to move into meshing relationship. On the other hand, upon admission of fluid pressure into the second cavity 68 the piston 44 moves away from the circular top plate 12 and simultaneously pushes any hydraulic fluid out of the first cavity 66. This axial movement of the piston 44 causes separation of the first and third rings of teeth 34, 62 respectively and the second and fourth rings of teeth 43, 64 respectively. The respective positions of the first and third rings of teeth 34, and 62 in the closed and opened positions are depicted in FIGS. 3a and 3b.

To prevent the leakage of hydraulic fluid from the first cavity 66, the outer periphery of the first radially extending portion 72 of the support tube 70 is provided with a gas seal which engages a mating surface 89 of the fixed base structure 80. Such a seal is conventional and is well known in the prior art.

The rotation of the circular top plate 12 is achieved by the aforementioned drive support tube 70 which is affixed to the circular top plate 12 by a series of cap screws 90 arranged about the central axis 20 of the circular top plate 12. The cap screws pass into counterbores 92, body passages 94 and into threaded bores 96 formed in the end face of the support tube 70 so as to secure the circular top plate 12 and the support tube 70 together for unitary rotation. A locating key 98 in a suitable keyway 100 insures precision location of the circular top plate 12 with respect to the support tube 70. Adjacent the inner face of the circular top plate 12 and the support tube 70, a sealing sleeve 102 is provided with sealed O-rings 104, 106 to provide a gas seal therebetween. Also, an annular notch is formed around each of the cap screws 90 so that a suitable O-ring 108 can be inserted therein to provide a fluid seal therebetween.

In between the support tube 70 and the fixed base structure 80 is a second annular cavity 110. A second drive gear 112 is disposed therein and connected to the support tube 70 by a series of cap screws 114 arranged about the central axis of the support tube 70. The second drive gear 112 is secured normal to the surface of the second radially extending portion 74 which forms a portion of the secound annular cavity 110. The cap screws 114 pass into bores 116 and threaded bores 118 formed in the surface of the second radially extending portions 74 of the support tube 70 securing the same together for unitary rotation. To insure radial location of the second drive gear 112 relative to the support tube 70, a locating key 120 is inserted into an appropriate notch formed on the exterior of the support tube and oppositely located notch in the inner diameter of the second drive gear 112. With the locating key 120 located in the mating notches between the support tube 70 and the second drive gear 112, precision radial location of the circular top plate 12 with respect to the second drive gear 112 is assured.

The second annular cavity 110 is enclosed by means of a base plate 122 which is suitably secured to the fixed base structure 80 by threaded fasteners as is conventional. The base plate 122 further has an inner diameter 124 which is sized to be slightly larger than the outer diameter 71 of the support tube. A suitable seal is provided in a suitable counterbore in the inner diameter 124 of the base plate 122 to provide a fluid seal therebetween. Additionally, the outer periphery of the base plate 122 is sealingly engaged to the fixed base structure 80 by threaded fasteners and seals.

The second drive gear 112 is mounted for slight axial movement within the second annular cavity 110 to accommodate the relative axial travel of the circular top plate 12 and the support tube 70. This relative axial travel occurs during the unlocking and locking operation of the piston 44 relative to the circular top plate 12 previously mentioned. A port 126 is formed in the outer periphery of the fixed base structure 80 to permit filling the second annular cavity 110 with suitable lubricating fluid as is conventional to lubricate the second drive gear 112 and its driving mechanism.

As discussed previously, the piston 44 is also mounted for axial movement in the central bore 84 of the fixed base structure 80. Thus, the piston 44 is mounted for axial movement relative to the support tube 70 to accomplish the meshing and demeshing of the coupling teeth previously described herewith. A thrust bearing 128 is disposed in the first cavity 66 formed between the bottom surface of the base member 46 and the first radially extending portion of the fixed base structure 80. The thrust bearing 128 accommodates the thrusting forces generated by gas pressure acting on the piston 44.

The first gear drive 48 of the piston 44 and the second drive gear 112 connected to the support tube 70 are each driven by an appropriate driving worm gear (not shown in the drawing) extending about an axis transverse to the axis of rotation of the circular top plate 12 and in mesh with the appropriate drive gear. Thus, rotation of each worm gear produces corresponding rotation of the circular top plate 12 or rotation of the piston 44. Since the rotary drive arrangement for both the first drive gear 48 and the second drive gear 112 are similar, the drive gear for the rotation of the circular top plate 12 will be explained in detail whereas the rotary drive arrangement for rotating the piston 44 will only be described insofar as it relates to the integration of same with the rotation of the piston 44.

Figure 5:
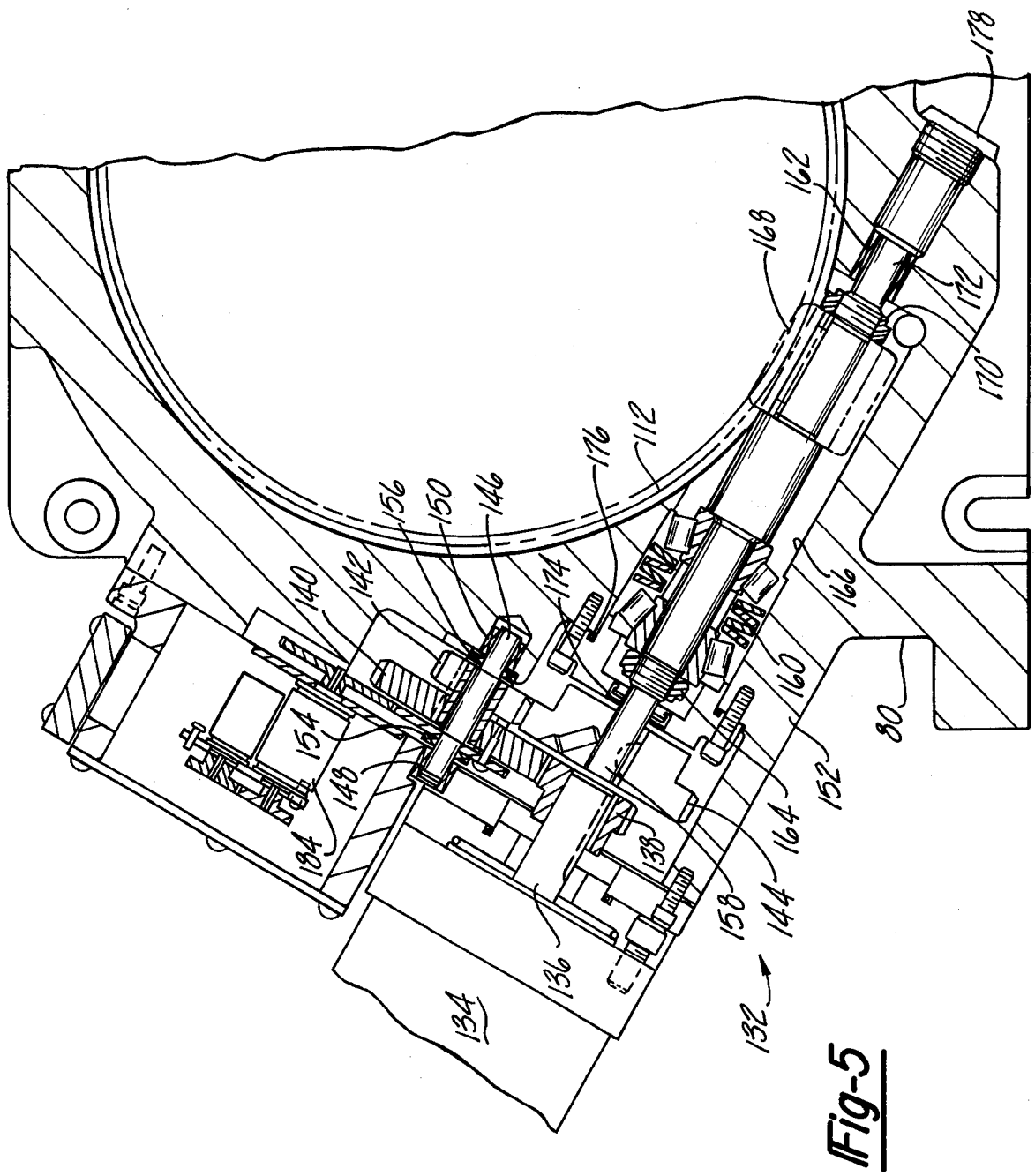
FIG. 5 is a fragmentary sectional view through the rotary drive assembly for the top plate.

Referring to FIG. 5, the rotary drive arrangement to cause rotation of the circular top plate 12 is depicted thereon. The rotary drive assembly is generally designated by the numeral 132 and includes a D.C. drive motor 134 having an output shaft 136. The output shaft 136 drives a spur gear reduction gear train consisting of spur gears 138, 140, 142 and 144. The spur gear 138 is keyed to the motor output shaft 136. The spur gears 140, 142 are rotatably supported on the pinion shaft 146. The pinion shaft 146 is supported on bearings 148, 150 in the gear housing 152. Thrust spacer bearings 154 and 156 are provided on the pinion shaft 146, one adjacent to the spur gear 140 and the other adjacent to the spur gear 142. The spur gear 144 is keyed to a drive shaft 158 which is rotatably mounted in the fixed base structure 80 by means of bearing assemblies 160 and 162. The drive shaft 158 is preloaded by means of a collar 164. The drive shaft 158 passes through a transverse bore 166 formed in the fixed base structure 80. A worm gear 168 is keyed to the far end of the drive shaft 158 with a lock nut 170 locking the worm gear 168 on the stub section 172 of the drive shaft 158. Suitable seals 174, 176 insure that lubricant does not pass into the interior of the fixed base structure 80 from the gear housing 152. An inspection plug 178 is provided at the end of the transverse bore 166. The worm gear 168 is also disposed in the second annular cavity 110 so as to mesh with the second drive gear 112.

The configuration of the fixed base structure 80 is such that the rotary drive assembly 132 may be mounted in any angular orientation relative to the periphery of the fixed base structure 80. This is rendered possible by providing appropriate cross bores for the drive shaft 158. Similarly, the rotary drive assembly 180 is mounted to the periphery of the fixed base structure 80 so that the driving worm gear referred to above extends about an axis transverse to the axis of rotation of the piston 44 and in mesh with the first drive gear 48. As stated previously, the rotation of the worm gear produces corresponding rotation of the piston 44 during indexing motion thereof.

The rotary drive assemblies 132, 180 respectively are each provided with digital counters 184 (only one of which is illustrated in FIG. 5) which count and determine the true location of the inner ring teeth and the outer ring teeth. Thus, the rotary drive assembly 132 and digital tooth counters 184 determine the tooth location on the outer ring teeth, that is, the second and fourth rings of teeth 43, 64 respectively. On the other hand, the rotary drive assembly 180 and its respective tooth counter 184 locate the first and third rings of teeth 34, 62 respectively. Those skilled in the art will recognize that one tooth on each ring is arbitrarily designated the "zero" tooth and all other teeth are counted relative to the "zero" tooth. Thus, the rotary drive assemblies 132, 180 respectively are designed to provide an absolute address of the tooth location. Therefore, when the counters 184 indicate a zero reading, a scale ring 188 (shown in FIG. 1) provided with a fixed indicator 190 will show an indication of a particular index position of the circular top plate 12 to be zero degrees.

To enable the operator to determine the exact location of the circular top plate 12 and the piston 44 to achieve the angular position required on the circular top plate 12, several mathematical formulas have been developed which are as follows:

$$B\ 1 = (\text{Fractional Remainder of } (81.6 \times A\ 1)) \times 360 \quad \text{Equation 1}$$

$$B\ 2 = (\text{Fractional Remainder of } (81.6 \times A\ 1)) \times 625 \quad \text{Equation 2}$$

$$B\ 3 = ((B2 \times 0.576) - A\ 1)/0.625 \quad \text{Equation 3}$$

Wherein A 1 equals the table face angle with respect to the zero angle in decimal degrees. A 2 is the table face plate angle with respect to the inner coupling tooth address (that is the tooth number) on the inner tooth coupling. B 1 is the inner coupling angle with respect to the zero angle in decimal degrees. B 2 is the inner coupling angle with respect to the zero angle in tooth address (tooth number) on the outer coupling. The fractional remainder, that is, the term less than 1, is multiplied by 360 and 625 in Equations 1 and 2 respectively.

It should be noted that the above mathematical formulas, that is, Equations 1 through 3 have been developed for the preferred embodiment, that is, where there are 576 teeth on the inner tooth coupling (the first and third rings of teeth) and 625 teeth on the outer tooth coupling (the second and fourth rings of teeth). Those skilled in the art will recognize, however, the principles of the invention may be applied to many other number of combinations of teeth on the inner and outer tooth couplings. Specific examples will now be given as to the use of Equations 1-3 as applied to the rotary indexing table 10.

EXAMPLE 1

If it is assumed that the circular top plate 12 is at 270° angular position and it is desired to set it at 15.253°, the following procedure is employed utilizing Equations 1 through 3. A 1 equals to 15.253° (given). Thus, it is necessary now to calculate B 2 and A 2. From Equation 2, B 2 equals to 625 times the fractional remainder of 81.6 × 15.253 or equals 625 times the fractional remainder of 1244.6448. The fractional remainder, 0.6448, is then multiplied by 625. Thus, B 2 equals to 403. From Equation 3, A 2 equals to 403 (0.576) minus 15.253 divided by 0.625. Thus, A 2 equals to 347. As noted previously, B 2 and A 2 are in absolute tooth address, that is, they describe the tooth number required on both the inner and outer coupling to achieve the desired angular position of the circular top plate 12. Thus, by rotating the rotary drive assembly 180 to a digital counter number 403 and rotating the rotary drive assembly 132 to a digital counter number 347 on the counter 184, the circular top plate 12 is positioned such that the indicator 190 would indicate on the scale ring 188 an angular position of 15.253°. As a check, it is to be noted that 576 teeth on 360° would equal a 0.625° per tooth. On the other hand, 625 teeth on a 360° table would equal a 0.576° per tooth. As discussed previously, A 2 is the tooth address on the inner coupling or the 576 tooth coupling. Thus, multiplying 347 by 0.625° per tooth equals to 216.875°. On the other hand, B 2 is the inner coupling angle with respect to ground to address on the 625 toothed coupling. Therefore, multiplying B 2, that is, 403 times 0.576° per tooth equals to 232.128°. The difference between 232.128 minus 216.875 equals 15.253° or the desired location.

EXAMPLE 2

If it is desired to rotate the circular top plate 12 to the 0.001° location, Equations 1 through 3 are again utilized to determined the absolute tooth address required to set on the inner and outer couplings to position the circular top plate 12 at the desired angular location. A 1 is given as 0.001°. B 2 equals to the fractional remainder of (81.6 × 0.001) times 625. Thus, B 2 equals to 51. A 2 equals to 51 (0.576) minus 0.001 divided by 0.625. Thus, A 2 equals to 47. Thus, to obtain a 0.001°, absolute angular position on the circular top plate 12, one must rotate the outer coupling to the 51 tooth location and the inner coupling to the 47 tooth location. As a check, 51 times 0.576° per tooth equals to 29.376° and 47 times 0.625° per tooth equals to 29.375. The difference between these two numbers is 0.001°.

Thus, it becomes apparent that the desired accuracy of the rotary indexing table 10 is achieved by rotating not only the piston 44 but the circular top plate 12 relative to each other and the fixed base structure in order to achieve the desired angular location on the circular top plate 12. It is recognized that the invention is not limited to 625 teeth on the outer coupling nor 576 teeth on the inner coupling but is merely the preferred embodiment in order to achieve a subdividing resolution of 360,000 positions on the circular top plate 12. As stated previously, many other combinations of the number of teeth on the inner and outer rings are possible to obtain various other possible angular positions of the circular top plate 12 relative to the fixed base structure 80.

As shown in FIG. 1, a known electrical fitting 196 is provided in order to provide electrical connections to the D.C. drive motor 134.

Figure 6:
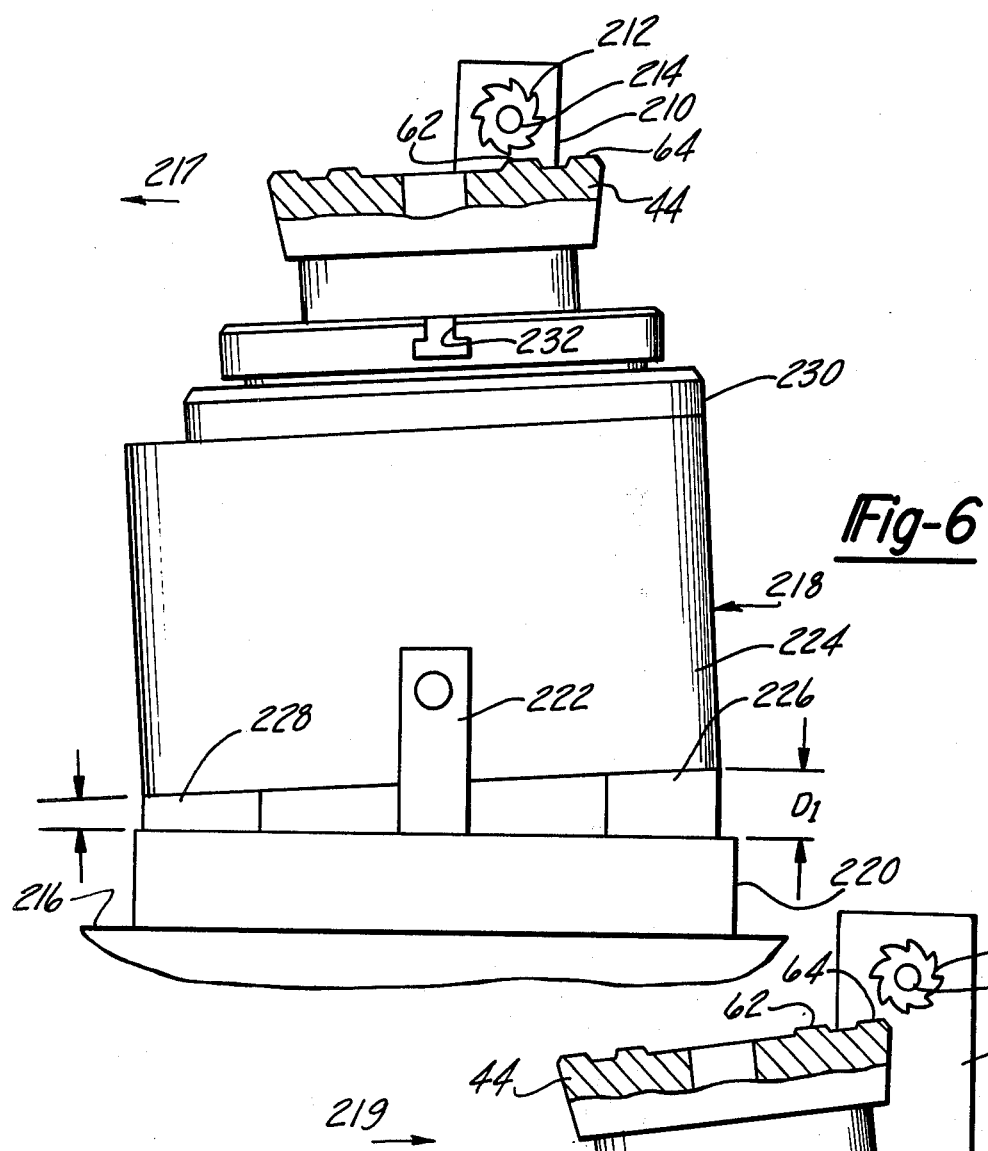
FIG. 6 is a side view illustrating the method of forming the first of the pair of concentric rings of teeth on the coupling member according to the present invention.
Figure 7:
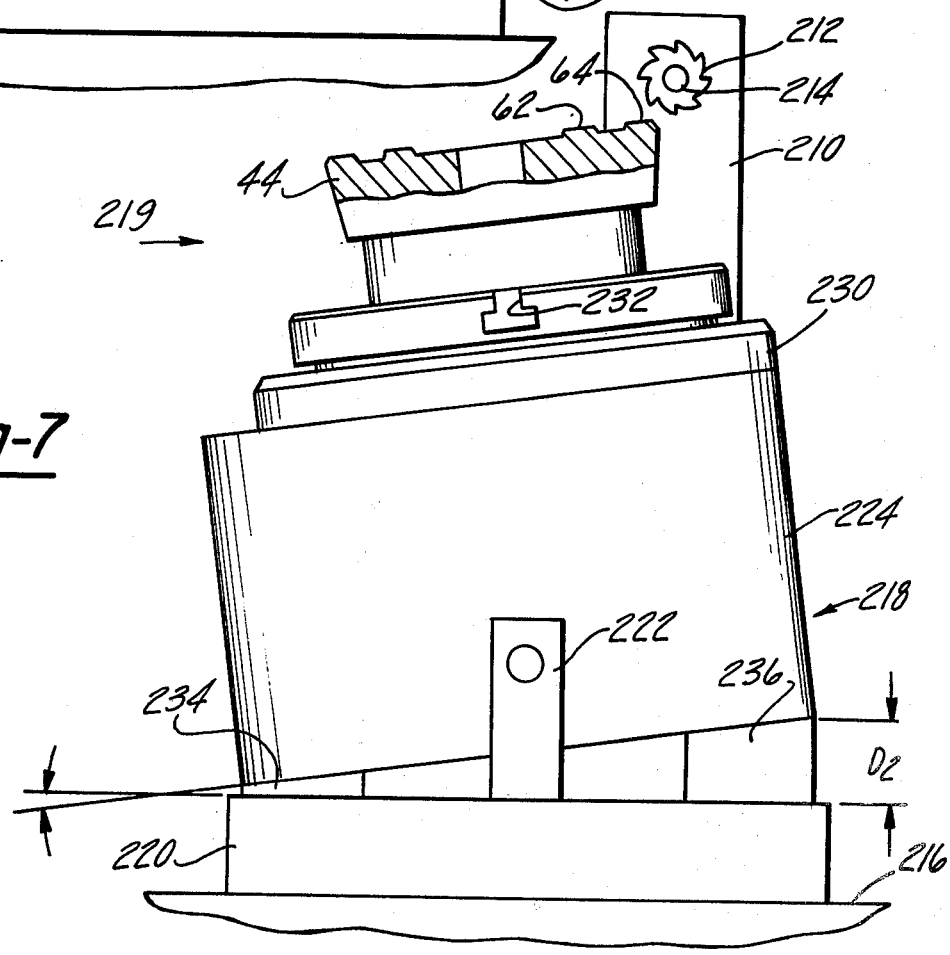
FIG. 7 is a side view of the method of forming the second of the pair of concentric rings on the coupling member according to the present invention.

The present invention is also concerned with a method of accurately forming the third and fourth rings of teeth on the top face 60 of the top member 50 of the piston 44. As shown in FIGS. 6 and 7, a conventional milling machine 210 is shown thereon. The milling machine 210 has a work table 216 which is substantially horizontal and a cutter 212 mounted on a spindle 214 which rotates normal to the axis of travel 217 of the work table 216. Next, a center sine block 218 having a base 220 is mounted to the work table 216. The center sine block 218 further has a center pivot 222 and a table top 224 pivotally mounted to the center pivot 222. Thus, the table top 224 may be moved angularly relative to the work table 216 by inserting wedges 226 of a predetermined size on one side and wedges 228 of another predetermined size on the other side of the center pivot 222 in order to set a predetermined angle. Next, a rotary indexing table 230 of conventional design is suitably fastened with its base adjacent to the table top 224 of the center sine block 218. Next, a coupling member or piston 44 is suitably secured to the top of the rotary indexing table 230 with the central axis of the piston 44 concentric with the central axis 232 of the rotary indexing table. As discussed previously, a first predetermined angle is set on the sine block. The purpose of the angle is to fix a first coning angle from the central axis of the piston so that the inner or third ring of teeth can be formed in the piston 44. Before placing the piston 44 on the rotary indexing table 230, the inner and outer rings are hardened by through hardening or flame hardening. The work table 216 of the milling machine 210 is made to travel in the direction 217 towards the cutter 212. The cutter is rotated on the spindle 214 by appropriate means (not shown) and the first tooth profile on the inner ring is formed. Next, the rotaty indexing table is rotated to a set predetermined angular position appropriate for the number of teeth desired on the inner coupling and, again, the work cycle is repeated until all the teeth on the inner ring coupling are formed. Next, the wedges 226, 228 are removed from the center sine block 218 and replaced with a second pair of wedges 234, 236 so as to set a second predetermined angle Y of the table top 224 with respect to the work table 216. Then, the work table 216 is made to travel in the direction 219 towards the cutter 212 so as to form the teeth on the outer ring or first ring of teeth on the piston 44. Again, once the first tooth is formed, the rotary indexing table is rotated to the next desired predetermined angular position and the work cycle repeated until all the teeth on the fourth ring of teeth 64 are formed in the piston 44.

Those skilled in the art will recognize that any number of teeth may be formed on the inner and outer rings of teeth and that the heretofore described method provides extreme accuracy in the formation of the inner and outer teeth by virtue of the fact that only the adjustment of the sine block is required in order to permit formation of the two sets of teeth on the piston 44. Thus, no inaccuracies due to changing the cutter position nor inaccuracies due to recentering the work piece on the rotary indexing table are possible utilizing the afore described method. Those skilled in the art will recognize the applicability of the above described method to any number of rings of teeth and that the invention is not limited to two concentric rings of teeth.

While the invention has been described in connection with the preferred embodiment and method, it will be understood that this invention is not intended to be limited to that embodiment or method. On the contrary, it is intended to incorporate all alternatives, modifications and equivalents as may be included within the spirit and scope of the invention as defined in the appended claims.

What is claimed is:

1. A method of forming a pair of concentric rings of face teeth on a coupling member, said method comprising the steps of:
    adjustably mounting a sine block on a work table by center pivot means such that the angle between said sine block and said work table is selectively adjustable about said center pivot means;
    fastening a first member of a rotary indexing table to said sine block, said rotary indexing table further comprising a second member rotatably interconnected with said first member;
    securing said coupling member to said second member of said rotary indexing table;
    setting a first predetermined angle of said sine block relative to said work table to fix a first coning angle from the central axis of said coupling member;
    cutting a first ring of said pair of concentric rings of face teeth on said coupling member;
    adjusting said sine block to a second predetermined angle to fix a second coning angle from the central axis of said coupling member; and
    cutting a second ring of said pair of concentric rings of face teeth on said coupling member.

2. The method of claim 1 further comprising before the securing step the additional step of hardening said coupling member.

3. The method of claim 1 wherein the first cutting step further comprises the steps of:
    relatively moving said coupling member and a rotating milling cutter so that a first face tooth of said first ring of said pair of concentric rings of face teeth is formed in said coupling member;
    relatively moving said coupling member and said milling cutter to disengage said coupling member from said milling cutter;
    rotating said coupling member a predetermined angular amount to a new position by operation of said rotary indexing table;
    milling another face tooth in said coupling member adjacent said first face tooth, by relatively moving said coupling member and said rotating milling cutter into engagement and subsequently relatively moving said coupling member and said rotating milling cutter from engagement; and
    alternatingly repeating said rotating step and said milling step such as to form additional face teeth in said coupling member until said first ring of said pair of concentric rings of face teeth is completely milled.

4. The method of claim 1 wherein the second cutting step further comprises the steps of:
    relatively moving said coupling member and a rotating milling cutter so that a first face tooth of said second ring of said pair of concentric rings of face teeth is formed in said coupling member;
    relatively moving said coupling member and said rotating milling cutter from engagement;
    rotating said coupling member a predetermined angular amount to a new position by operation of said rotary indexing table;
    milling another face tooth in said coupling member adjacent said first face tooth of said second ring of face teeth by relatively moving said coupling member and said rotating milling cutter into engagement and subsequently relatively moving said rotating milling cutter and said coupling member from engagement; and
    alternatingly repeating said rotating step and said milling step such as to form additional face teeth in said coupling member until said first ring of said pair of concentric rings of face teeth is completely milled.

5. The method of claim 1 wherein said first ring of said pair of concentric rings of teeth has 576 teeth.

6. The method of claim 1 wherein said second ring of said pairs of concentric rings of face teeth has 625 teeth.

7. The method of claim 1 wherein said first ring of said pair of concentric rings of face teeth has a first predetermined number of teeth and wherein said second ring of said pair of concentric face teeth has a second predetermined number of teeth, said first predetermined number being different from said second predetermined number.

8. The method of claim 1 wherein;
said sine block is pivotally mounted to said work table by center pivot means;
the step of setting a first predetermined angle on said sine block comprises inserting a first wedge of a first predetermined size between said work table and said sine block on one side of said center pivot means and inserting a second wedge of a second predetermined size between said work table and said sine block on the opposite side of said center pivot means from said first wedge; and
the step of adjusting said sine block to a second predetermined angle comprises removing said first wedge and said second wedge and inserting a third wedge and a fourth wedge, respectively, in their place, said third wedge and said fourth wedge having respectively a third and a fourth predetermined size.

9. A method of forming a first ring of face teeth on an upper face of a coupling member, said first ring of face teeth having a first predetermined number of face teeth, and of forming a second ring of face teeth on said upper face of said coupling member, said second ring of face teeth having a second predetermined number of teeth, said first predetermined number being different from said second predetermined number, said second ring of face teeth being concentric with said first ring of face teeth, said method comprising the steps of:

pivotally mounting a sine block on a top surface of a work table of a milling tool having a rotating cutter by center pivot means, said top surface of said work table being displaceable tangentially relative to said rotating milling cutter;
fastening a lower member of a rotary indexing table on the top of said sine block, said rotary indexing table having an upper member rotatably interconnected with said lower member;
securing said coupling member to said upper member of said rotary indexing table such that said upper face of said coupling member is disposed remote from said upper member of said indexing table and further such that said upper face is moveable into and out of engagement with said rotary milling cutter by tangentially displacing said work piece relative to said rotating milling cutter;
setting a first predetermined angle of said sine block relative to said top surface of said work table to fix a coning angle from the central axis of said coupling member;
tangentially moving said top surface of said work table relative to said rotating milling cutter of said milling tool to bring said rotating milling cutter into engagement with said upper surface of said coupling member so that a first tooth of said first ring of face teeth is formed on said upper face of said coupling member;
rotating said upper member of said rotary indexing table relative to said lower member thereof a predetermined angular amount such as to dispose said coupling member in a new angular position relative to said rotating milling cutter;
milling another face tooth in said coupling member adjacent said first face tooth by moving said coupling member towards said rotating milling cutter and subsequently moving said coupling member away from said milling cutter;
alternatingly repeating said rotating step and said milling step until said first ring of face teeth is completely milled on said upper face of said coupling member;
adjusting said sine block to a second predetermined angle relative to said top surface of said work table to fix a second coning angle from the central axis of said coupling member;
tangentially moving said top surface of said work table relative to said rotating milling cutter to bring said rotating milling cutter into engagement with said upper surface of said coupling member so that a first tooth of said second ring of face teeth is formed on said upper face of said coupling member at a different radial location about said coupling member from said first ring of face teeth;
rotating said upper member of said rotary indexing table relative to said lower member thereof and a second predetermined angular amount such as to dispose said coupling member in a new angular position relative to said rotating milling cutter said second predetermined angular amount being different from said first predetermined amount;
milling another face tooth in said coupling member adjacent said first face tooth of said second ring of face teeth by moving said coupling member towards said rotating milling cutter and subsequently moving said coupling member away from said rotating milling cutter; and
alternatingly repeating said rotating step and said milling step until said second ring of face teeth is completely milled on said upper face of said coupling member, said second ring of face teeth being concentric with said first ring of face teeth.

10. The method of claim 9 further comprising, before securing step the step of hardening said coupling member.

11. The method of claim 9 wherein said first ring of said pair of concentric rings of face teeth has 576 teeth.

12. The method of claim 9 wherein said second ring of said pair of concentric rings of face teeth has 625 teeth.

13. The method of claim 9 wherein:
the step of setting a first predetermined angle on said sine block consists of inserting a first wedge of a first predetermined size between said top surface of said work table and the base of said sine block on one side of said center pivot means and inserting a second wedge of a second predetermined size between said top surface of said work table and said base of said sine block on the opposite side of said center pivot means from said first wedge; and
the step of adjusting said sine block to a second predetermined angle comprises removing said first wedge and said second wedge and inserting a third wedge and a fourth wedge, respectively, in their place, said third wedge and said fourth wedge having a third and a fourth predetermined size, respectively.

14. A method of forming a pair of concentric rings of face teeth on a coupling member, said method comprising the steps of:
adjustably mounting a sine block on a work table by center pivot means such that the angle between said sine block and said work table is selectively adjustable about said center pivot means;

fastening a lower member of a rotary indexing table on the top of said sine block, said rotary indexing table further comprising an upper member rotatably interconnected with said lower member;

securing said coupling member to said upper member of said rotary indexing table;

setting a first predetermined angle of said sine block relative to said work table to fix a first coning angle from the central axis of said coupling member;

cutting a first ring of said pair of concentric rings of face teeth on said coupling member, said first ring of said pair of concentric rings having 576 teeth;

adjusting said sine block to a second predetermined angle to fix a second coning angle from the central axis of said coupling member; and cutting a second ring of said pair of concentric rings of face teeth on said coupling member, said second ring of said pairs of concentric rings having 625 teeth.

15. The method of claim 14 further comprising, before the securing step, the additional step of hardening said coupling member.

16. The method of claim 14 wherein the first cutting step further comprises the steps of:

relatively moving said coupling member and a rotating milling cutter so that a first face tooth of said first ring of said pair of concentric rings of face teeth is formed in said coupling member;

relatively moving said coupling member of said milling cutter to disengage said coupling member from said milling cutter;

rotating said coupling member a predetermined angular amount to a new position by operation of said rotary indexing table;

milling another face tooth in said coupling member adjacent said first face tooth, by relatively moving said coupling member and said rotating milling cutter into engagement and subsequently relatively moving said coupling member and said rotating milling cutter from engagement; and alternatingly repeating said rotating step and said milling step such as to form additional face teeth in said coupling member until said first ring of said pair of concentric rings of face teeth is completely milled.

17. The method of claim 14 wherein the second cutting step further comprises the steps of:

relatively moving said coupling member and a rotating milling cutter so that a first face tooth of said second ring of said pair of concentric rings of face teeth is formed in said coupling member;

relatively moving said coupling member and said rotating milling cutter from engagement;

rotating said coupling member a predetermined angular amount to a new position by operation of said rotary indexing table;

milling another face tooth in said coupling member adjacent said first face tooth of said second ring of face teeth by relatively moving said coupling member and said rotating milling cutter into engagement and subsequently relatively moving said rotating milling cutter and said coupling member from engagement; and alternatingly repeating said rotating step and said milling step such as to form additional face teeth in said coupling member until said first ring of said pair of concentric rings of face teeth is completely milled.

18. The method of claim 17 wherein;

said sine block is pivotally mounted to said work table by center pivot means;

the step of setting a first predetermined angle on said sine block comprises inserting a first wedge of a first predetermined size between said work table and said sine block on one side of said center pivot means and inserting a second wedge of a second predetermined size between said work table and said sine block on the opposite side of said center pivot means from said first wedge; and the step of adjusting said sine block to a second predetermined angle comprises removing said first wedge and said second wedge and inserting a third wedge and a fourth wedge, respectively, in their place, said third wedge and said fourth wedge having respectively a third and a fourth predetermined size.

19. The method of claim 18 further comprising, before the securing step, the additional step of hardening said coupling member.

* * * * *

UNITED STATES PATENT AND TRADEMARK OFFICE
CERTIFICATE OF CORRECTION

PATENT NO. : 4,463,488

DATED : August 7, 1984

INVENTOR(S) : Daniel J. Pieczulewski

It is certified that error appears in the above-identified patent and that said Letters Patent is hereby corrected as shown below:

Column 1, line 32, delete the numeral "25".

Column 4, line 29, delete "plate. Then" and insert ---- plate, then ----.

Column 4, line 30, delete "securing". Same line, after "member" insert ---- is secured ----.

Column 4, line 31, delete "setting".

Column 4, line 32, after "block" insert ---- is set ----.

Column 4, line 36, delete "adjusting". Same line, after "block" insert ---- is adjusted ----.

UNITED STATES PATENT AND TRADEMARK OFFICE
CERTIFICATE OF CORRECTION

PATENT NO. : 4,463,488

DATED : August 7, 1984

INVENTOR(S) : Daniel J. Pieczulewski

It is certified that error appears in the above-identified patent and that said Letters Patent is hereby corrected as shown below:

Column 4, line 38, delete "cutting". Same line, delete "second of" and insert ---- second ----.

Column 4, line 39, delete "the pair" and insert ---- pair ----. Same line, after "teeth" insert ---- are cut ----.

Column 4, line 45, delete "insure" and insert ---- insures ----.

Column 4, line 57, delete "complimetary" and insert ---- complementary ----.

Column 5, line 66, after "race" insert ---- coupling ----.

Column 6, line 4, after "race" insert ---- coupling ----.

Column 6, line 10, after "first top" insert ---- face ----. Same line, after "second top" insert ---- face ----.

Column 6, line 11, after "top" insert ---- face ----.

Column 6, line 12, after the numeral "26" insert ---- of the circular top plate 12 ----.

UNITED STATES PATENT AND TRADEMARK OFFICE
CERTIFICATE OF CORRECTION

PATENT NO. : 4,463,488

DATED : August 7, 1984

INVENTOR(S) : Daniel J. Pieczulewski

Sheet 3 of 7

It is certified that error appears in the above-identified patent and that said Letters Patent is hereby corrected as shown below:

Column 6, line 13, delete "base" and insert --- top face ----.

Column 6, line 14, after "first" insert ---- top ----.

Column 6, line 15, after "second" insert top ----.

Column 6, line 23, delete "complimentary" and insert ---- complementary ----.

Column 6, line 33, after "top" insert ---- face ----.

Column 6, line 40, after "top" insert ---- face ----.

Column 7, line 23, delete "the support" and insert ---- a support ----.

Column 7, line 34, delete "cross section." and insert ---- cross-section. ----.

Column 7, line 35, delete "cross section" and insert ---- cross-section ----.

Column 7, line 39, delete "being" and insert ---- are ----.

Column 7, line 40, after "designated" insert ---- as ----.

UNITED STATES PATENT AND TRADEMARK OFFICE
CERTIFICATE OF CORRECTION

PATENT NO. : 4,463,488

DATED : August 7, 1984

INVENTOR(S) : Daniel J. Pieczulewski

It is certified that error appears in the above-identified patent and that said Letters Patent is hereby corrected as shown below:

Column 7, line 41, delete "being" and insert ---- are ----. Same line, after "designated" insert ---- as ----.

Column 7, line 65, delete "respectively," and insert ---- respectively are the same, ----.

Column 8, line 23, delete "if" and insert ---- is ----.

Column 8, line 28, delete "valve" and insert ---- valving ----.

Column 8, line 51, delete "A" and insert ---- The ----.

Column 8, line 66, delete "34," and insert ---- 34 ----.

Column 9, line 8, delete "drive".

Column 9, line 31, delete "secound" and insert ---- second ----.

Column 10, line 33, delete "on the" and insert ---- on a ----.

Column 10, line 45, delete "the stub" and insert ---- a stub ----.

Column 11, line 27, delete "B 3" and insert ---- A 2 ----.

UNITED STATES PATENT AND TRADEMARK OFFICE
CERTIFICATE OF CORRECTION

PATENT NO. : 4,463,488

DATED : August 7, 1984

Sheet 5 of 7

INVENTOR(S) : Daniel J. Pieczulewski

It is certified that error appears in the above-identified patent and that said Letters Patent is hereby corrected as shown below:

Column 11, line 49, delete "1-3" and insert ---- 1 through 3 ----.

Column 13, line 18, delete "rotaty" and insert ---- rotary ----.

Column 13, line 45, delete "afore described" and insert ---- afore-described ----.

In the Claims

Column 14, line 23, before "milling" insert ---- rotating ----.

Column 14, line 24, before "milling" insert ---- rotating ----.

Column 14, line 59, delete "first" and insert ---- second ----.

Column 14, line 63, before "teeth" insert ---- face ----.

Column 15, line 28, after "number of" insert ---- face ----.

Column 15, line 34, after "rotating" insert ---- milling ----.

Column 15, line 47, delete "rotary" and insert ---- rotating ----.

Column 15, line 62, before "predetermined" insert ---- first ----.

Column 16, line 2, before "milling" insert ---- rotating ----.

UNITED STATES PATENT AND TRADEMARK OFFICE
CERTIFICATE OF CORRECTION

PATENT NO. : 4,463,488
DATED : August 7, 1984
INVENTOR(S) : Daniel J. Pieczulewski It is certified that error appears in the above-identified patent and that said Letters Patent is hereby corrected as shown below:

Column 16, line 20, delete "thereof and" and insert ---- thereof ----.

Column 16, line 23, after "cutter" insert a comma ---- , ----.

Column 16, line 25, after "predetermined" insert ---- angular ----.

Column 17, line 18, delete "pairs" and insert ---- pair ----.

Column 17, line 21, delete "the securing" and insert ---- said securing ----.

UNITED STATES PATENT AND TRADEMARK OFFICE
CERTIFICATE OF CORRECTION

PATENT NO. : 4,463,488
DATED : August 7, 1984
INVENTOR(S) : Daniel J. Pieczulewski It is certified that error appears in the above-identified patent and that said Letters Patent is hereby corrected as shown below:

Column 17, line 29, before "milling" insert ---- rotating ----.

Column 17, line 31, before "milling" insert ---- rotating ----.

Column 18, line 43, delete "the securing" and insert ---- said securing ----.

Signed and Sealed this

Fifth Day of November 1985

[SEAL]

Attest:

*Attesting Officer*

DONALD J. QUIGG

*Commissioner of Patents and Trademarks*